Sept. 29, 1931.   W. SCHWEMLEIN   1,825,096
ROCKER BEARING FOR WALKING BEAMS
Filed July 11, 1929
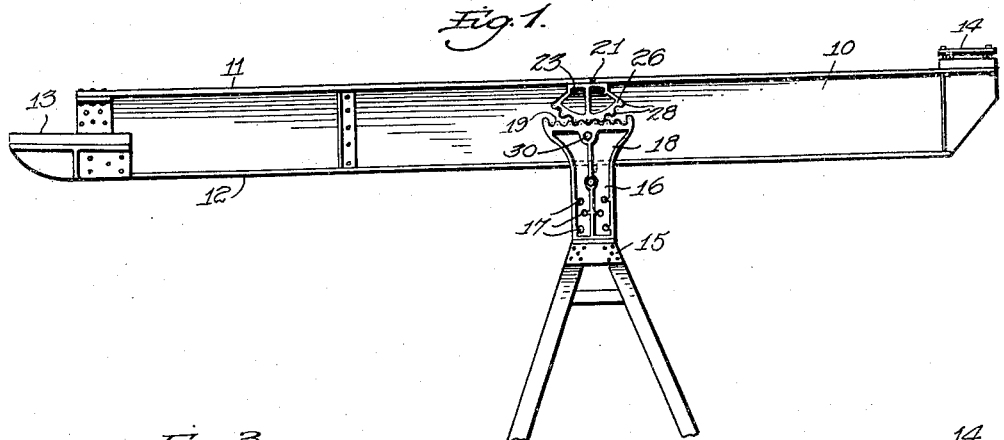
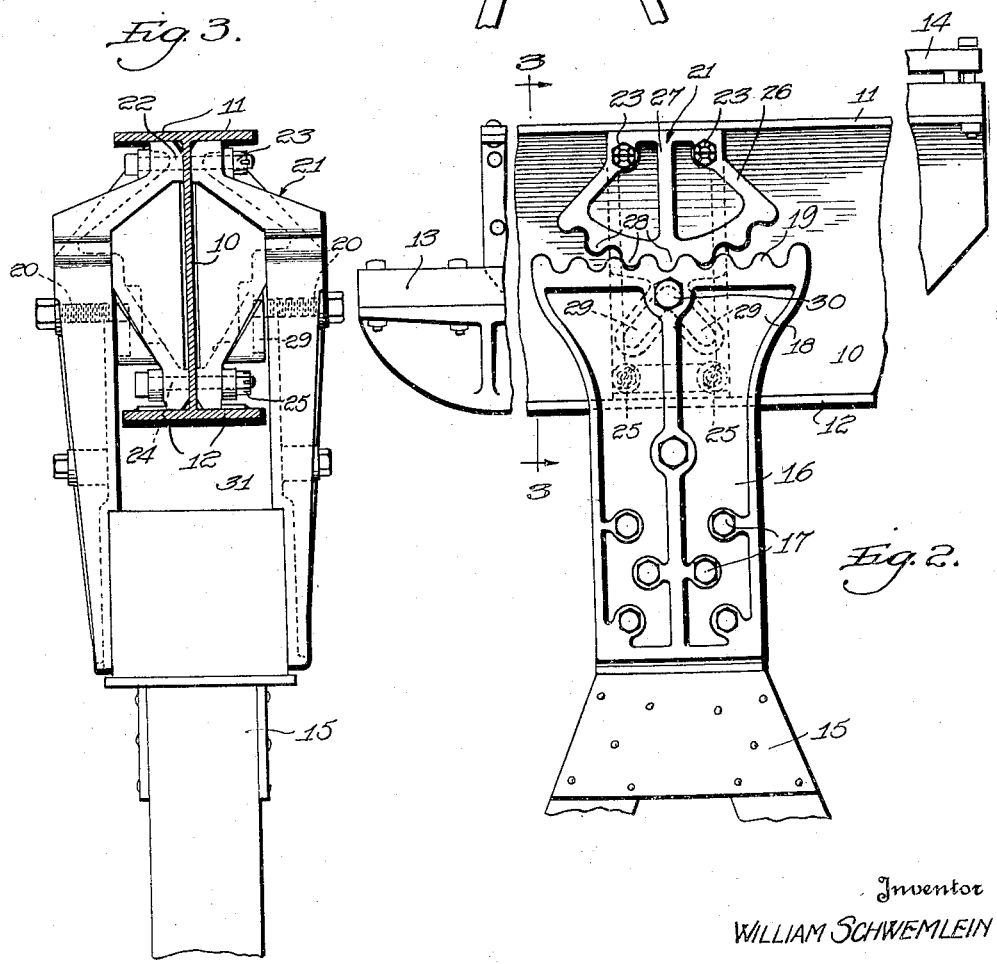
Inventor
WILLIAM SCHWEMLEIN
By C. L. Parker Jr.
Attorney Patented Sept. 29, 1931

1,825,096

UNITED STATES PATENT OFFICE

WILLIAM SCHWEMLEIN, OF PARKERSBURG, WEST VIRGINIA, ASSIGNOR TO THE PARKERSBURG RIG AND REEL COMPANY, OF PARKERSBURG, WEST VIRGINIA, A CORPORATION OF WEST VIRGINIA

ROCKER BEARING FOR WALKING BEAMS

Application filed July 11, 1929. Serial No. 377,549.

This invention relates to a rocker bearing particularly adapted for use in connection with walking beams and the like, used in drilling and pumping deep wells.

Heretofore it has been customary to fulcrum the walking beam on a plain cylindrical trunnion mounted on the bottom of the beam and to mount the temper screw or polish rod hanger on the top of the beam at one end thereof. As the trunnion does not make complete revolutions, but oscillates over a small arc, it is difficult to properly lubricate the bearing and this is a source of trouble due to constant wear. Also, the frictional resistance of this type bearing is considerable resulting in undue power consumption. With this type of bearing it will be obvious that the horizontal movement of the temper screw during oscillation of the beam will be considerable for any sweep of the beam and will result in a decided slap of the temper screw and a decided bending strain on the polish rod. It is my purpose in the present invention to provide a bearing which will obviate the above and other numerous disadvantages of prior constructions.

An object of this invention is to provide a rocker bearing for walking beams in which the frictional resistance is reduced to a minimum and which requires no lubricant.

Another object is to provide a rocker bearing wherein the fulcrum point of the walking beam is substantially in horizontal alignment with the temper screw bearing when the beam is in horizontal position, to reduce to a minimum the horizontal movement of the temper screw during oscillation of the beam.

A further object is to provide a rocker bearing having a corrugated seat arranged on the top of a Samson post, the walking beam being provided with corrugated members engaging said seat, the engagement being in a plurality of changing point contacts between the corrugated members and the seat.

A further object is to provide a rocker bearing with toothed members carried by the walking beam and Samson post respectively, the teeth of the members engaging in interrupted rocking contact.

Other objects and advantages of the invention will become apparent during the course of the following description.

In the drawings I have shown one embodiment of my invention. In this showing,

Figure 1 is a side elevation of a walking beam,

Figure 2 is an enlarged side elevation of the bearing, parts of the beam and Samson post being broken away, and, Figure 3 is a sectional view taken substantially on line 3—3 of Figure 2.

Referring to the drawings the numeral 10 indicates a walking beam of the I-beam type provided with upper flanges 11 and lower flanges 12. One end of the walking beam is provided with a bearing 13 adapted to receive the temper screw or polish rod and the opposite end of the beam is provided with a bearing 14 to which the pitman is adapted to be attached. The walking beam is adapted to be mounted for oscillation on a Samson post 15 and the present invention is concerned with novel bearing means for permitting this oscillation of the walking beam.

The numeral 16 designates a pair of side plates provided with a plurality of openings through which bolts 17 are adapted to extend in order to rigidly secure the plates to the sides of the upper end of the Samson post. As shown, each plate 16 is provided with a widened portion 18 extending upwardly a substantial distance beyond the top of the Samson post and the upper surface of each plate is relatively narrow in comparison with the thickness of the Samson post. The upper surfaces of the plates are provided with teeth 19 whereby a pair of racks are provided on opposite sides of the Samson post. Below these teeth 19 and substantially centrally of the width of each plate an opening 20 is provided for a purpose to be described. The plates 16 provide a seat upon which the walking beam is to be mounted.

A rocker element indicated as a whole by the numeral 21 is adapted to be secured to each side of the walking beam. The rocker elements are secured adjacent the top thereof directly beneath the upper flanges 11 of the beam, bolts 22 and nuts 23 being utilized for this purpose. The bolts 22 extend through the beam and upper portions of the rocker elements to rigidly secure the latter in position as will be understood. Similarly the bottom of the rocker elements are secured to the beam adjacent the flanges 12 by means of bolts 24 and nuts 25.

Each rocker element 21 is provided with a downwardly inclined overhanging wing portion 26 formed as a segment of a circle and having a dished outer surface strengthened by means of a rib 27. The portions 26 extend beyond the side edges of the flanges 11 and 12 as shown in Figure 3. The lower faces of the portions 26 are really the rocker portions of the elements 21 and these faces are provided with a plurality of teeth 28 adapted to mesh with the rack teeth 19 on the upper surface of the plates 16. As clearly shown in Figure 2 the teeth 19 and 28 are adapted to mesh at a point substantially in horizontal alinement with the temper screw bearing 13 when the walking beam is in its horizontal position.

Beneath the teeth 28 the element 21 is provided with a pair of communicating cycloidally plotted grooves 29 and stub pins 30 are adapted to extend through the opening 20 in the plate 16 and into the grooves 29. The pins 30 and grooves 29 provide means for retaining the walking beam on the Samson post and it will be apparent by reference to Figures 2 and 3 that the beam will not become displaced as the inner extremity of the pins 30 will always engage the walls of the grooves 29 regardless of the position the beam may take during its oscillation.

As shown in Figure 3 the top of the Samson post is spaced from the bottom of the walking beam substantially as indicated at 31. This space may be of any size whereby the beam may freely oscillate without engaging the top of the Samson post.

The upper surface of the plates 16 is what is termed the load surface and in this invention the load surface is wholly corrugated throughout its area. Likewise the toothed faces of the rocker portions 26 are wholly corrugated and consequently the action of the walking beam is rocker action with engagement contact, and alinement by, upon and between wholly corrugated surfaces.

The operation of the device is as follows:
When the walking beam is in the horizontal position shown in the drawings the teeth 19 and 28 will be in mesh in a line substantially horizontal with the temper screw bearing 13 and it will be apparent that the horizontal movement of the temper screw or polish rod will be considerably less than if the fulcrum point of the walking beam was beneath the beam. In fact the horizontal movement of the elements secured to the temper screw end of the beam is reduced to a minimum and the undesirable slapping of these elements is nearly if not entirely eliminated. As the beam oscillates, the engagement between the rocker portions and the upper surfaces of the plates 16 is interrupted constantly because of the corrugations, yet the engagement is always positive and the rocker portions engage the upper surfaces of the plates 16 at a plurality of changing point contacts instead of in a single point contact as was true of prior constructions.

It is believed to be obvious that the frictional resistance of the bearing has been substantially reduced by the use of my invention and because of the rocker motion no lubricant will be required on the bearing. Inasmuch as substantially no friction is present, the wear will also be eliminated and where it has been customary to replace the center trunnions of walking beams frequently with the old type bearing, the rocker type bearing will have a very much extended life.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A bearing for a walking beam comprising a seat resting upon the head of a Samson post and having upstanding side cheeks provided with corrugated upper surfaces, rocker elements attached to the sides of said walking beam and provided with corrugated faces engaging the corrugated surfaces of said side cheeks in interrupted rocking contact in a plane intermediate the top and bottom of said beam, and means for maintaining said beam in position on said seats.

2. A bearing for a walking beam having a temper screw attachment point, comprising a seat resting upon the head of a Samson post and having upstanding side cheeks provided with corrugated upper surfaces, rocker elements arranged on the sides of said walking beam and provided with corrugated faces engaging the corrugated surfaces of said cheeks in interrupted rocking contact, said corrugations meeting substantially in horizontal alinement with the temper screw engagement point of said beam when the latter is in a horizontal position, and means for maintaining said beam in position on said seat.

3. A bearing for a walking beam comprising a seat arranged on the upper end of a Samson post, said seat comprising a pair of spaced upstanding side plates arranged on opposite sides of said beam and provided with rack teeth on their upper surfaces, a pair of rocker elements arranged on opposite sides of said beam, each rocker element including a portion formed as a segment of a circle provided with teeth meshing with said rack teeth in interrupted rocking contact in a plane intermediate the top and bottom of said beam, and means for retaining said beam in position on said seat.

4. A bearing for a walking beam having a temper screw engagement point, comprising a seat arranged on the upper end of a Samson post, said seat comprising a pair of spaced upstanding side plates arranged on opposite sides of said beam and provided with rack teeth on their upper surfaces, a pair of rocker elements arranged on opposite sides of said beam, each rocker element including a portion formed as a segment of a circle provided with teeth meshing with said rack teeth in interrupted rocking contact, said teeth meshing substantially in horizontal alinement with the temper screw engagement point of said beam when the latter is in horizontal position, and means for retaining said beam in position on said seat.

5. In a device of the character described, a Samson post having on its upper end wholly corrugated top load surfaces, and a walking beam having a rocker portion on each side thereof provided with a wholly corrugated face, the corrugations of said faces uniformly engaging the corrugations of the load surfaces in a plane intermediate the top and bottom of said beam to provide a plurality of changing point contacts of the faces and the load surface.

6. In a device of the character described, a Samson post having on its upper end corrugated top load surfaces, and a walking beam including a temper screw engagement point, said beam having a rocker portion on each side thereof provided with a corrugated face, the corrugations of said faces engaging the corrugations of the load surfaces substantially in horizontal alinement with the temper screw engagement point of said beam when the latter is in a horizontal position, the corrugations of said faces also engaging the corrugations of the load surface in a plane intermediate the top and bottom of said beam.

7. In a device of the character described, a Samson post having upwardly extending side cheeks, rack teeth arranged on the upper surfaces of said cheeks, a walking beam having rocker portions on opposite sides thereof, each portion comprising a segment of a circle, and teeth arranged on said portions to mesh with said rack teeth in a plane intermediate the top and bottom of said beam to provide a plurality of changing point contacts of said cheeks and said rocker portions.

8. In a device of the character described, a Samson post having upwardly extending side cheeks, rack teeth arranged on the upper surfaces of said cheeks, a walking beam including a temper screw attachment point, said beam having rocker portions on opposite sides thereof, and teeth arranged on said rocker portions to mesh with said rack teeth substantially in horizontal alinement with the temper screw engagement point of said beam when the latter is in a horizontal position, said teeth also meshing in a plane intermediate the top and bottom of said beam.

9. In a device of the character described, a Samson post having upwardly extending side cheeks, relatively narrow rack teeth arranged on the upper surfaces of said cheeks, a walking beam, rocking elements secured on opposite sides of said beam, relatively narrow teeth arranged on said rocking elements and meshing with said rack teeth, said rocking elements having depending portions extending below the toothed portions thereof and being provided with cycloidally plotted grooves in said depending portions, and stub pins carried by said side cheeks and extending into said grooves.

10. A bearing for a walking beam comprising a seat resting upon the head of a Samson post and having an upstanding side cheek arranged on each side of said beam, each side cheek being provided with a wholly corrugated upper surface, a rocker element attached to each side of said beam, each rocker element being provided with a wholly corrugated face engaging one of the corrugated surfaces of said side cheeks in interrupted rocking contact in a plane intermediate the top and bottom of said beam, each rocker element being also provided below its corrugated face with a cycloidally plotted groove, and pins carried by said side cheeks and extending into said grooves to maintain said beam in position on said seat.

In testimony whereof I affix my signature.

WILLIAM SCHWEMLEIN.